(12) United States Patent
Vichit-Vadakan et al.

(10) Patent No.: US 8,864,903 B2
(45) Date of Patent: Oct. 21, 2014

(54) COMPOSITE PLASTER INCLUDING AN ORGANIC ADDITIVE

(71) Applicant: SCG Cement Company Limited, Bangkok (TH)

(72) Inventors: Wilasa Vichit-Vadakan, Bangkok (TH); Pichet Sahachaiyunta, Pathumthani Province (TH); Prapas Oodtiya, Lamphun Province (TH)

(73) Assignee: SCG Cement Company Limited, Bangkok (TH)

( * ) Notice: Subject to any disclaimer, the term of this patent is extended or adjusted under 35 U.S.C. 154(b) by 72 days.

(21) Appl. No.: 13/717,054

(22) Filed: Dec. 17, 2012

(65) Prior Publication Data

US 2014/0116297 A1 May 1, 2014

Related U.S. Application Data

(60) Provisional application No. 61/719,791, filed on Oct. 29, 2012.

(51) Int. Cl.
C04B 24/10 (2006.01)
C04B 14/28 (2006.01)
C04B 7/02 (2006.01)

(52) U.S. Cl.
CPC .................................. *C04B 24/10* (2013.01)
USPC ........................... 106/730; 106/713; 106/738

(58) Field of Classification Search
CPC ............ C04B 24/10; C04B 7/02; C04B 14/28
USPC .......................................... 106/730, 713, 738
See application file for complete search history.

(56) References Cited

U.S. PATENT DOCUMENTS

| | | | |
|---|---|---|---|
| 2,470,505 A | 5/1949 | Ludwig | |
| 2,489,793 A | 11/1949 | Ludwig | |
| 5,588,990 A | 12/1996 | Dongell | |
| 6,324,802 B1 | 12/2001 | Garrett | |
| 6,653,373 B2 | 11/2003 | Garrett et al. | |
| 6,893,496 B1 | 5/2005 | Liljenquist | |
| 2006/0204569 A1 | 9/2006 | Obae et al. | |

FOREIGN PATENT DOCUMENTS

| | | |
|---|---|---|
| CN | 1105692 A | 7/1995 |
| GB | 1030018 | 5/1966 |

(Continued)

OTHER PUBLICATIONS

Okafor, F.O., "The Performance of Cassava Flour as a Water-Reducing Admixture for Concrete," Nigerian Journal of Technology, vol. 29, No. 2, pp. 106-112, Jun. 2010.

(Continued)

*Primary Examiner* — Paul Marcantoni
(74) *Attorney, Agent, or Firm* — Seed IP Law Group PLLC

(57) ABSTRACT

Plaster compositions including at least one cement having a first particle distribution and a first mode, at least one non-reactive fine aggregate having a second particle size distribution and a second mode, at least one non-reactive coarse aggregate having a third particle size distribution and a third mode, and an unmodified, hydrophilic, starch. The first mode is greater than the second mode and less than the third mode. The combination of cement, non-reactive fine and coarse aggregates and unmodified, hydrophilic, starch produces a plaster composition having favorable properties suitable for use in providing exposed aggregate finishes used in water reservoirs, pools, and stucco finishes.

20 Claims, 4 Drawing Sheets

(56) References Cited

FOREIGN PATENT DOCUMENTS

| GB | 1 306 774 | 2/1973 |
|----|-----------|--------|
| JP | 2004269501 A | 10/2007 |
| KR | 100883330 B1 | 2/2009 |
| WO | 2005/105048 A1 | 11/2005 |

OTHER PUBLICATIONS

Anwar, E. et al., An Approach on "Pregelatinized Cassava Starch Phosphate Esters as Hydrophilic Polymer Excipient for Controlled Release Tablet," J. Med. Sci., vol. 6, No. 6, pp. 923-929, Nov.-Dec. 2006.

COMPOSITE PLASTER INCLUDING AN ORGANIC ADDITIVE

BACKGROUND

1. Technical Field

The present disclosure generally relates to the field of cementitious products and, more particularly to cementitious products including one or more organic additives.

2. Description of the Related Art

Pool construction begins with excavation of the pool basin followed by installation of plumbing and reinforcing steel within the basin. The reinforcing steel is covered with a concrete mixture such as gunite or shotcrete. After the gunite or shotcrete cures, additional tile, coping, and electrical work is completed. The final step includes the installation of a finish over the gunite or shotcrete that provides an attractive decorative surface as well as seals the underlying rough gunite or shotcrete surface. Such a finish should provide a reasonable degree of resistance to physical damage from everyday usage. Such a finish should also be resistant to chemical attack from atmospheric pollutants and water treatment chemicals. Traditionally, pools were finished with a "pool plaster" mixture containing white Portland cement, marble or limestone aggregate, fillers such as sand, and smaller quantities of miscellaneous additives such as set accelerators and pumping aids.

While pool finishing technology remained relatively stagnant, pool water treatment technology continued to evolve in the face of environmental and health concerns, and to meet consumer demands for ease of use, and economics. Current pool water treatment regimes often rely upon the use of acidic sanitizers such as bromochlorodimethylhydantoin. The use of acidic water treatment chemicals has been blamed for staining, etching, scale formation, and overall deterioration of the alkaline pool plaster traditionally used to finish the interior surfaces of swimming pools. In particular, it has been observed that the smooth finish typically used on the surface of the pool plaster makes defects attributable to physical damage or chemical attack quite noticeable.

Consequently, newer finishes have been developed to at least mitigate the adverse visual impact of such physical damage or chemical attack. One finish that has gained in popularity over the years is an exposed aggregate finish that may sometimes be referred to as a "pebble finish." Such exposed aggregate finishes rely on the dispersal of one or more adjunct aggregates and one or more colorants in the plaster prior to application. The adjunct aggregate and colorant containing plaster is applied conventionally and smoothed on the interior surface of the pool. After application, a portion of the upper surface of the finish is removed to expose the underlying adjunct aggregate and to provide the exposed aggregate finish. While damage from improper water treatment or conditioning may occur to such an exposed aggregate finish, the presence of the exposed, irregular aggregates and colorants in the finish tends to mitigate the visual impact of such damage. Stains, repairs, and other blemishes are also more easily disguised against the irregular surface of the exposed aggregate finish. The benefits afforded by exposed aggregate surface finishes have resulted in widespread acceptance and demand for such finishes.

New approaches to improving the workability, ease of application, and performance of exposed aggregate finishes for pools and other structures are therefore desirable.

BRIEF SUMMARY

A plaster used as a binder in the exposed aggregate plaster slurry must have sufficient adhesive properties to retain the added adjunct aggregates while having sufficient workability to permit pumping and smoothing of the aggregate plaster slurry over the underlying substrate. Increasing the quantity of water in the exposed aggregate plaster slurry to improve pumpability and workability often leads to insufficient adhesion between the plaster and the substrate and between the plaster and the adjunct aggregates present. On the other hand, reducing the quantity of water in the aggregate plaster slurry may improve adhesion between the aggregate and the plaster and the slurry and the underlying substrate but compromises the pumpability and workability of the exposed aggregate plaster slurry.

It has been found that the cement used in formulating the plaster used as a binder in the exposed aggregate plaster slurry falls within a first particle size distribution having a first statistical mode. Mixing a non-reactive fine aggregate having a second particle size distribution and a second statistical mode that is less than the first mode and a non-reactive coarse aggregate having a third particle size distribution and a third statistical mode that is greater than the first mode with the plaster has been found to improve the workability of the plaster and the resultant exposed aggregate plaster slurry using the plaster as a sole or contributory binder. Specifically, the use of white Portland cement and white limestone comprising mostly calcite has been found to provide a white plaster that is particularly suitable for decorative applications such as pool plastering, stucco, decorative cast items, and other objects, items, and surfaces where an exposed aggregate finish is desirable.

The addition of small quantities of unmodified agricultural starches to the plaster used as a binder in an exposed aggregate plaster slurry has been found to advantageously improve workability of the slurry while providing surprising adhesive properties that assist in retaining the slurry on the underlying substrate and in retaining the aggregate dispersion within the slurry. The improved workability and adhesive properties have been found after adding small quantities of unmodified hydrophilic starches such as tapioca starch, cassava starch, rice starch, corn starch, wheat starch, or potato starch to the plaster. The white color typically associated with unmodified agricultural starches advantageously assists in maintaining a white plaster binder in the exposed aggregate plaster slurry.

A plaster composition useful in providing an exposed aggregate finish can include: a cement having a first particle size distribution with a first mode; a non-reactive fine aggregate having a second particle size distribution with a second mode that is less than the first mode; a non-reactive coarse aggregate having a third particle size distribution with a third mode that is greater than the first mode; and an unmodified hydrophilic starch. In at least some instances, the cement used in the plaster composition can have a HunterLab whiteness value in excess of about 90. In at least some instances, the cement used in the plaster composition can have a first particle size distribution that includes cement particles having a particle size of from about 0.1 micrometers (μm) to about 100 μm.

In at least some instances, the non-reactive fine aggregate and the non-reactive coarse aggregate in the plaster composition may include chemically inert or chemically non-reactive aggregates having a HunterLab whiteness value in excess of about 90. In at least some instances, the non-reactive fine aggregate and the non-reactive coarse aggregate in the plaster composition may include limestone. In at least some instances, the non-reactive fine aggregate and the non-reactive coarse aggregate in the plaster composition may include limestone and substantially all of the limestone can comprise calcite.

In at least some instances, the non-reactive fine aggregate particle size distribution (i.e., the "second particle size distribution") can include non-reactive aggregate particles having a particle size from about 0.1 micrometers (μm) to about 100 μm. In at least some instances, the statistical mode of the non-reactive fine aggregate particles (i.e., the "second mode") is at least about 2 micrometers (μm) less than the first mode.

In at least some instances, the non-reactive coarse aggregate particle size distribution (i.e., the "third particle size distribution") can include non-reactive aggregate particles having a particle size from about 0.1 micrometers (μm) to about 250 μm. In at least some instances, the statistical mode of the non-reactive coarse aggregate particles (i.e., the "third mode") is at least about 10 micrometers (μm) greater than the first mode.

In at least some instances, the unmodified hydrophilic starch in the plaster composition can include at least one of: a tapioca starch, a cassava starch, a potato starch, a rice starch, a wheat starch, or a corn starch. In at least some instances, the unmodified starch can have a HunterLab whiteness value in excess of about 90. In at least some instances, the unmodified starch can have a minimum of about 80% by weight amylopectin content. In at least some instances, the unmodified starch can have a moisture or water content of less than about 15% by weight.

A method of providing a plaster mixture can include combining a cement, a fine non-reactive aggregate, a coarse non-reactive aggregate, and an unmodified hydrophilic starch to provide a cement mixture comprising: about 60% to about 98% by weight of a cement having a first particle size distribution of from about 0.1 micrometers (μm) to about 100 μm with a first mode; about 1% to about 30% by weight of a non-reactive fine aggregate having a particle size distribution of from about 0.1 micrometers (μm) to about 100 μm, and a second mode that is at least about 2 micrometers (μm) less than the first mode; about 1% to about 30% by weight of a non-reactive coarse aggregate having a particle size distribution of from about 0.1 micrometers (μm) to about 250 μm, and a third mode that is at least about 10 micrometers (μm) greater than the first mode; and about 0.001% to about 5% by weight of an unmodified, hydrophilic, starch having a minimum amylopectin content of about 80% by weight.

In at least some instances, the method of providing a plaster mixture can also include combining the cement mixture with at least one adjunct aggregate having a diameter of greater than about 0.5 millimeters (mm) and water to provide an exposed aggregate plaster slurry. In at least some instances, the exposed aggregate plaster mixture can be applied to at least a portion of an interior surface of a water reservoir. In at least some instances, at least one colorant may be mixed or otherwise combined with the exposed aggregate plaster slurry prior to application to at least a portion of the interior surface of the water reservoir. In at least some instances, the method of providing a plaster mixture may also include combining the cement mixture with at least water to provide a cement slurry; and applying the cement slurry to a structure.

A plaster composition can include: about 60% to about 98% by weight of a white Portland cement having a HunterLab whiteness value in excess of about 90 and a first particle size distribution of from about 0.1 micrometers (μm) to about 100 μm with a first mode; about 1% to about 30% by weight of a non-reactive fine aggregate having a HunterLab whiteness value in excess of about 90, a particle size distribution of from about 0.1 micrometers (μm) to about 100 μm, and a second mode that is at least about 2 micrometers (μm) less than a first mode; about 1% to about 30% by weight of a non-reactive coarse aggregate having a HunterLab whiteness value in excess of about 90, a particle size distribution of from about 100 micrometers (μm) to about 250 μm, and a third mode that is at least about 10 micrometers (μm) greater than the first mode; and about 0.001% to about 5% by weight of an unmodified, hydrophilic starch having a HunterLab whiteness value in excess of about 90, a minimum amylopectin content of about 80% by weight, and a water content of less than about 15% by weight.

In at least some instances, the non-reactive fine aggregate and the non-reactive coarse aggregate may each comprise limestone. In at least some instances, the non-reactive fine aggregate and the non-reactive coarse aggregate in the plaster composition may include limestone and substantially all of the limestone can comprise calcite. In at least some instances, the unmodified hydrophilic starch in the plaster composition can include at least one of: a tapioca starch, a cassava starch, a potato starch, a rice starch, a wheat starch, or a corn starch.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, components having well-known or well-documented physical and chemical compositions such as white Portland cement have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

Figure 1:
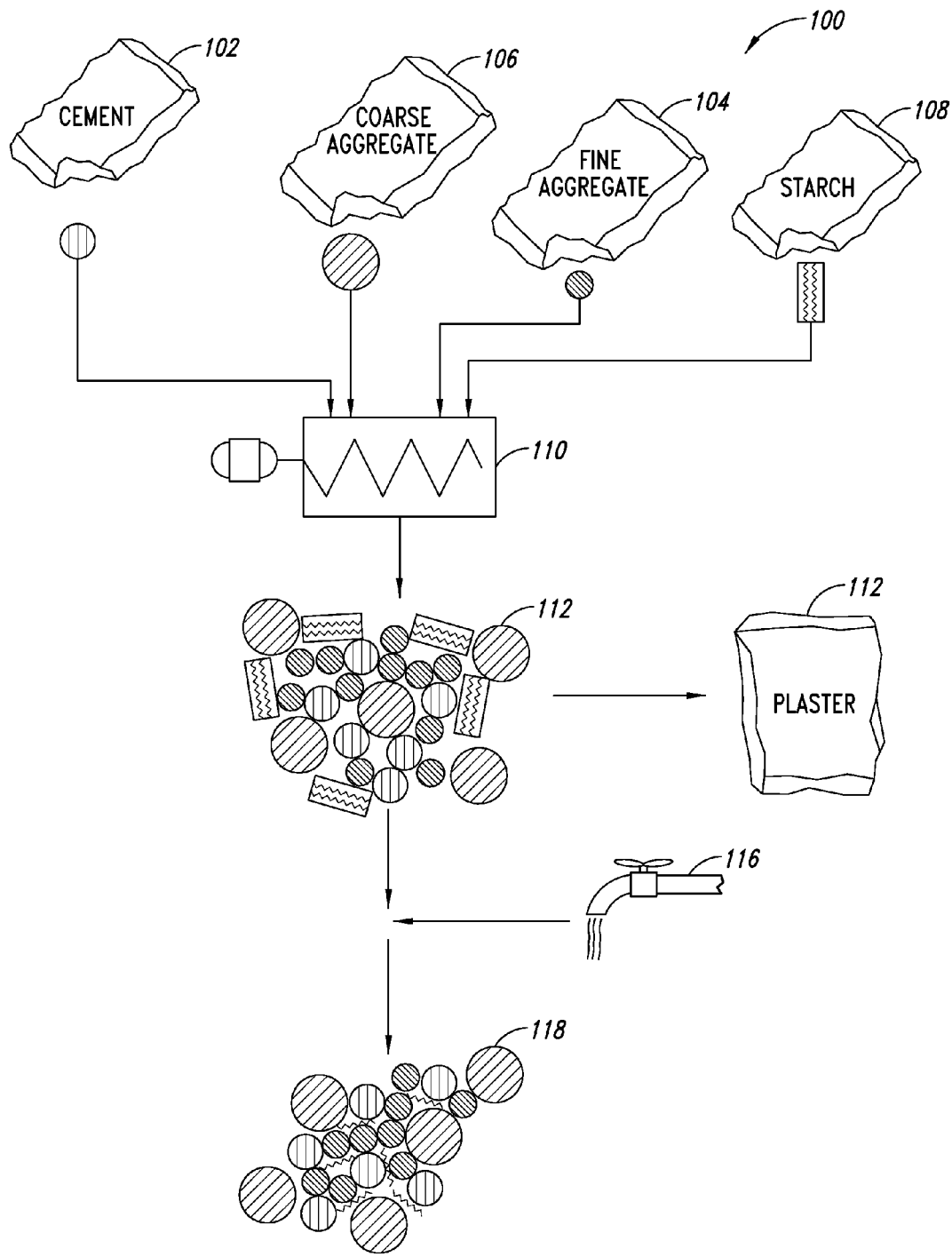
FIG. 1 is a schematic diagram illustrating an example formulation of a plaster including a cement, a non-reactive fine aggregate, a non-reactive coarse aggregate, and a starch that is useful in pool plastering, according to one non-limiting illustrated embodiment.

FIG. 1 shows an illustrative formulation 100 of a plaster using at least one cement 102, at least one fine aggregate 104, at least one coarse aggregate 106, and at least one starch 108. The at least one cement 102, aggregates 104, 106, and starch 108 are combined to provide a plaster mixture 112 that can be commercially marketed as a plaster or plaster mixture 112 useful for providing finishes on virtually any surface, including, but not limited to, vertical surfaces such as pool plaster swimming pools, exposed aggregate finished swimming pools, exterior stucco applications, interior stucco applications, and the like. A plaster slurry 118 is formed by mixing the plaster 112 with an appropriate quantity of water 116.

The at least one cement 102 can include any binder or similar substance capable of adhering to the aggregates 104, 106. The cement 102 can include various quantities of calcium oxide, silicon dioxide, and contaminants such as aluminum oxide, ferric oxide and sulfates. Other adjuncts, additives, or other compositions may be added to the cement 102 to provide one or more desired properties such as an early set, delayed set, high early strength, etc. In at least one instance, at least a portion of the cement 102 can include an ordinary Portland cement ("OPC") having a composition of: 60%-72% by weight calcium oxide; 22%-27% by weight silicon dioxide; 3%-6% by weight aluminum oxide; less than 1% by weight ferric oxide; and 0.5%-4.5% be weight sulfate. Minerals within OPC cause an overall greenish-grey tint to the cured OPC. In some instances, the impact of such coloration is not objectionable and an OPC may be used to provide at least a portion of the at least one cement 102. For example, the cement 102 may contain about 5% by weight or less OPC; about 10% by weight or less OPC; about 25% by weight or less OPC; about 50% by weight or less OPC; about 75% by weight or less OPC; about 90% by weight or less OPC; or about 100% by weight or less OPC.

In other instances, cement 102 having a white or near white color is preferable to provide a plaster 112, plaster slurry 118 and cured plaster finish product having a white or near white color. The use of at least one white or near white cement 102 in the plaster advantageously permits the mixing of virtually any colorant and virtually any adjunct aggregate with the plaster 112 to provide an exposed aggregate plaster slurry in which the plaster 112 forms at least a portion of the binder. Such white or near white cements can include, but are not limited to white Portland cement ("WPC") or similar cements. WPC can be formulated using limestone and other components that are low in metals and other color producing contaminants such as chromium, manganese, iron, copper, vanadium, nickel and titanium containing compounds. Such white Portland Cements are commercially available under, among others, trade names such as Lafarge White Portland Cement, Lehigh White Cement, and Royal White Portland Cement. In at least some instances a WPC may be used to provide at least a portion of the at least one cement 102. For example, the at least one cement 102 may contain about 5% by weight or more WPC; about 10% by weight or more WPC; about 25% by weight or more WPC; about 50% by weight or more WPC; about 75% by weight or more WPC; about 90% by weight or more WPC; about 95% by weight or more WPC; or about 99% by weight or more WPC. In at least some instances, the cement 102 can include a white Portland cement having a HunterLab whiteness value in excess of about 60; in excess of about 70; in excess of about 80; in excess of about 90; or in excess of about 93.

The properties of the plaster 112 (e.g., adhesion, workability, pumpability, etc.) can be dependent upon one or more physical properties of the at least one cement 102 used in the plaster 112. For example, the properties of the plaster 112 may depend at least in part on the particle size distribution of the various component particles (e.g., calcium oxide, silicon dioxide, etc.) forming the cement 102. In at least some instances, the cement 102 can have a particle size distribution (i.e., the "first particle size distribution") of from about 0.1 micrometers (μm) to about 200 μm; from about 0.1 μm to about 150 μm; or from about 0.1 μm to about 100 μm. In at least some instances, the cement 102 particle size distribution can have a statistical mode (i.e., the "first mode") between about 5 micrometers (μm) to about 75 μm; about 5 μm to about 50 μm; about 5 μm to about 40 μm; about 5 μm to about 30 μm; about 5 μm to about 25 μm; or about 5 μm to about 20 μm. As used herein the terms "mode" and "statistical mode" when applied to a particle size distribution represent the particle size that occurs with the greatest frequency in the given particle size distribution.

In at least some instances the cement 102 can comply with, meet or exceed one or more standard specifications. In some instances, the cement 102 can meet American Society of Testing Materials (ASTM) Standard Specification C150/C150M ("Standard Specification for Portland Cement"—Latest Version). Within the cement industry, the Blaine number is a traditional measure of particle fineness. The Blaine number measures the specific surface area of the particles in the cement (e.g., in units of square centimeters per gram or $cm^2/g$) and therefore provides an inferential measure of the degree of fineness of the particles forming the cement (i.e., greater numbers of fine particles generally have a larger specific surface area than smaller numbers of larger particles). In at least some instances, the cement 102 can have a Blaine number of from about 2,600 square centimeters per gram ($cm^2/g$) to about 5,500 $cm^2/g$; about 3,000 $cm^2/g$ to about 5,000 $cm^2/g$; or about 3,500 $cm^2/g$ to about 4,500 $cm^2/g$.

The non-reactive fine aggregate 104 can include any material having suitable chemical and physical properties including being chemically inert or otherwise non-reactive within the plaster 112. The non-reactive fine aggregate 104 can have of a physical or chemical composition and color that lightens or otherwise has minimal, or ideally no, impact on the final color of the plaster 112. The non-reactive fine aggregate 104 can be the same as or different in composition from the non-reactive coarse aggregate 106. In at least some instances, the non-reactive fine aggregate 104 can have a HunterLab whiteness value in excess of about 60; in excess of about 70; in excess of about 80; in excess of about 90; or in excess of about 93.

In at least some instances, at least a portion of the non-reactive fine aggregate 104 may include limestone or a limestone containing material, a marble material, a silica containing material, or similar materials. The chemical composition and physical form of the limestone forming the non-reactive fine aggregate 104 has been found to impact the ultimate performance of the plaster 112. It has been observed that dedolomitization may occur where dolomitic limestone is used to provide at least a portion of the non-reactive fine aggregate 104. The process of dedolomitization generates a greater volume of products than reactants which may cause detrimental swelling in, and consequent damage to, the plaster 112. It has also been observed that aragonite is structurally more brittle than calcite and that aragonite often occurs in less desirable or preferable off-white shades. Thus, limestone in the form of calcite is preferred over dolomitic limestones or limestone having a higher concentration of dolomite, and over limestone in the physical form of aragonite. In at least some instances, the non-reactive fine aggregate 104 can include a limestone having that is a minimum of about 80% by weight calcite; about 85% by weight calcite; about 90% by weight calcite; about 95% by weight calcite; or about 99% by weight calcite. In at least one instance, the non-reactive fine aggregate 104 can include a crushed limestone having a minimum calcite composition of 95% by weight, and a HunterLab whiteness in excess of about 90.

Performance of the plaster 112 can also be dependent upon one or more physical properties of the non-reactive fine aggregate 104, for example the particle size distribution of the particles forming the non-reactive fine aggregate 104. In at least some instances, the non-reactive fine aggregate 104 can have a particle size distribution (i.e., the "second particle size distribution") of from about 0.1 micrometers (μm) to about 250 μm; from about 0.1 μm to about 200 μm; from about 0.1 μm to about 150 μm; or from about 0.1 μm to about 100 μm. The statistical mode of the non-reactive fine aggregate 104 particles is less than the statistical mode of the cement 102 particles. In at least some instances, the statistical mode (i.e., the "second mode") of the non-reactive fine aggregate 104 particles can be less than the statistical mode of the cement 102 particles by about 1 micrometers (μm) to about 20 μm; about 2 μm to about 15 μm; or about 3 μm to about 10 μm.

The non-reactive coarse aggregate 106 can include any material having suitable chemical and physical properties including being chemically inert or otherwise non-reactive within the plaster 112. The non-reactive coarse aggregate 106 should be of a composition and color that lightens or otherwise has minimal, or ideally no, impact on the final color of the plaster 112. The non-reactive coarse aggregate 106 can be the same as or different in composition from the non-reactive fine aggregate 104. In at least some instances, the non-reactive coarse aggregate 106 can include any inert or non-reactive material or mixture of materials having a HunterLab whiteness value in excess of about 60; in excess of about 70; in excess of about 80; in excess of about 90; or in excess of about 91.5.

In at least some instances, at least a portion of the non-reactive coarse aggregate 106 may include limestone or a limestone containing material, a marble material, a silica containing material, or similar materials. The chemical composition and physical form of the limestone forming the non-reactive coarse aggregate 106 has been found to impact the ultimate performance of the plaster 112. For at least the same reasons as discussed above with regard to the non-reactive fine aggregate 104, for the non-reactive coarse aggregate 106 limestone in the form of calcite is preferred over either dolomite or aragonite. In at least some instances, the non-reactive coarse aggregate 106 can include a limestone having that is a minimum of about 80% by weight calcite; about 85% by weight calcite; about 90% by weight calcite; about 95% by weight calcite; or about 99% by weight calcite. In at least one instance, the non-reactive coarse aggregate 106 can include a crushed limestone having a minimum calcite composition of 95% by weight, and a HunterLab whiteness in excess of about 91.5.

Performance of the plaster 112 can also be dependent upon one or more physical properties of the non-reactive coarse aggregate 106, for example the particle size distribution of the particles forming the non-reactive coarse aggregate 106. In at least some instances, the non-reactive coarse aggregate 106 can have a particle size distribution (i.e., the "third particle size distribution") of from about 0.1 micrometers (μm) to about 500 μm; from about 0.1 μm to about 400 μm; from about 0.1 μm to about 350 μm; from about 0.1 μm to about 300 μm; or from about 0.1 μm to about 250 μm. The statistical mode (i.e., the "third mode") of the non-reactive coarse aggregate 106 is greater than the statistical mode of the cement 102. In at least some instances, the statistical mode of the non-reactive coarse aggregate 106 particles can exceed the statistical mode of the cement 102 particles by about 5 micrometers (μm) to about 75 μm; about 10 μm to about 60 μm; or about 15 μm to about 50 μm.

The starch 108 can include any naturally occurring unmodified hydrophilic starch that is unaltered from its naturally occurring form. Suitable starches include, but are not limited to tapioca starch, cassava starch, corn starch, wheat starch, rice starch, potato starch, and combinations thereof. The starch 108 should be of a color that lightens or otherwise has minimal, or ideally no, impact on the final color of the plaster 112. In at least some instances, the starch 108 can have a HunterLab whiteness value in excess of about 60; in excess of about 70; in excess of about 80; in excess of about 90; or in excess of about 93. In at least some instances, the starch 108 can have a moisture content of no more than about 13% by weight; no more than about 15% by weight; or no more than about 20% by weight.

Starch is comprised of two polysaccharides, amylopectin which has a branched polymeric form and amylose which has a linear polymeric form. It has been found that amylopectin beneficially provides adhesive properties to better hold or otherwise retain one or more adjunct aggregates mixed with a plaster 112 binder for use in exposed aggregate finish applications. In at least some instances, the starch 108 can have a polysaccharide composition that is at least 70% amylopectin by weight; at least 75% amylopectin by weight; at least 80% amylopectin by weight; or at least 82% amylopectin by weight.

The skeletal density of a material is the ratio of the mass of the discrete pieces of solid material to the sum of the volumes of the solid material in the pieces and the closed (or blind) pores within the pieces of solid material per ASTM specification D3766. In at least some instances, the starch 108 can have a skeletal density of from about 1.1 grams per cubic centimeter ($g/cm^3$) to about 1.9 $g/cm^3$; from about 1.2 $g/cm^3$ to about 1.8 $g/cm^3$; or from about 1.3 $g/cm^3$ to about 1.7 $g/cm^3$.

The cement 102, non-reactive fine aggregate 104, non-reactive coarse aggregate 106, and the unmodified hydrophilic starch 108 are combined, for example using a ribbon or rotary mixer 110 or similar mixing device suitable of blending or homogenizing dry products to form the plaster mixture 112. The quantities of cement 102, non-reactive fine aggregate 104, non-reactive coarse aggregate 106, and starch 108 added to the plaster mixture 112 determine the properties of the plaster. For example, increased quantities of non-reactive fine aggregate 104 may be used to improve the early set strength of the plaster 112 however such increased quantities of non-reactive fine aggregate 104 may require the addition of extra water to the plaster mixture 112 to improve workability. Such additional water may detrimentally affect the cure time of the plaster 112 and may also detrimentally affect the ability of the plaster 112 to adhere to the underlying surface without excessive slumping. In another example, increased quantities of non-reactive coarse aggregate 106 may improve the workability of the plaster by reducing the quantity of water required thereby increasing the ability of the plaster to adhere to the underlying surface without slumping. However, increased quantities of non-reactive coarse aggregate may detrimentally impact the strength of the plaster. The use of a unmodified hydrophilic starch in the composition provides a degree of workability, specifically, the "spray and stay" characteristic that makes the plaster 112 workable on vertical surfaces. At low concentrations, the presence of the starch advantageously has been found to assist the plaster 112 in resisting the force of gravity by retaining the plaster 112 and exposed aggregate plaster slurries in place after being sprayed on a vertical surface such as a water reservoir, pool, wall, or similar vertical or near-vertical surface.

The composition of the resultant plaster 112 has an impact on the overall workability and cured properties of the plaster. In at least some instances, the cement 102 content of the plaster 112 can be from about 60% to 98% by dry weight; from about 60% to 95% by dry weight; from about 60% to 85% by dry weight; from about 65% to 80% by dry weight; or from about 70% to 77% by dry weight. In at least some instances, the non-reactive coarse aggregate 106 content of the plaster 112 can be from about 1% to 30% by dry weight; from about 5% to 30% by dry weight; from about 5% to 25% by dry weight; from about 10% to 25% by dry weight; or from about 14% to 17% by dry weight. In at least some instances, the non-reactive fine aggregate 104 content of the plaster 112 can be from about 1% to 30% by dry weight; from about 5% to 30% by dry weight; from about 5% to 25% by dry weight; from about 5% to 15% by dry weight; or from about 9% to 11% by dry weight. In at least some instances, the unmodified hydrophilic starch 108 content of the plaster 112 can be from about 0.001% to 3% by dry weight; from about 0.001% to 1% by dry weight; from about 0.01% to 1% by dry weight; from about 0.1% to 1% by dry weight; from about 0.4% to 1% by dry weight; or from about 0.4% to 0.6% by dry weight.

In some instances the resultant plaster 112 can comply with one or more industry recognized standard specifications. For example, in some instances, the plaster 112 can comply with American Society of Testing Materials ("ASTM") Standard Specification C595/C595M ("Standard Specification for Blended Hydraulic Cements"—Latest Version). In at least some instances, the resultant plaster 112 can comply with one or more industry recognized performance standards. For example, in some instances, the resultant plaster can comply with ASTM Performance Specification C1157/C1157M ("Standard Performance Specification for Hydraulic Cement"—Latest Version).

The composition of the plaster 112 has advantageously been found to provide benefits when used as a binder for exposed aggregate finished surfaces such as those found in swimming pools, stucco finishes, and the like. Specifically, the particle size distribution of the plaster 112 is graded such that the non-reactive fine aggregate 104 and the non-reactive coarse aggregate 106 make up most of the very fine and very coarse particles present in the plaster 112. The remaining middle portion of the particle size distribution of the plaster 112 is made up of cement particles 102. Recall, the statistical mode of the non-reactive fine aggregate (i.e., the "second mode") is less than the statistical mode of the cement particles (i.e., the "first mode") and the statistical mode of the non-reactive coarse particles (i.e., the "third mode") is greater than the statistical mode of the cement particles. Such a particle size distribution within the plaster 112 minimizes water demand and maximizes the strength of the plaster. The addition of a small quantity of starch 108 has been found to advantageously provide a degree of cohesiveness and workability to the cement and non-reactive fine and coarse aggregates in the plaster 112 upon the addition of water.

Water 116 is added to the plaster 112 to form the plaster slurry 118. As water is added, several reactions occur within the plaster slurry 118. In at least some instances, at least a portion of the water added to the plaster 112 can be absorbed by the unmodified hydrophilic starch. In at least some instances, at least a portion of the water 116 added to the plaster 112 remains as an unbound or free alkaline liquid within the plaster as a consequence of the hydration of the calcium oxide present in the cement 102 to form calcium hydroxide. This high pH environment has been found to advantageously alter the chemical and physical properties of even small quantities of unmodified hydrophilic starch 108 present in the plaster 112 thereby improving the performance of the plaster.

The altered physical properties of the unmodified hydrophilic starch 108 have been found to improve the workability of the plaster by promoting greater adhesion between the plaster 112 and the underlying structure and between the various components (e.g., adjunct aggregates) in the plaster 112 itself. Such advantageous properties were found present at surprisingly low starch concentrations. For example, improved workability of the plaster 112 was found to occur with unmodified hydrophilic starch 108 concentrations of less than 1% by dry weight of the plaster 112, and even as low as 0.001% by dry weight of the plaster 112. Without intending to be bound to any specific mechanism, it is believed that the observed increase in cohesiveness of the unmodified hydrophilic starch 108 in the plaster 112 is not attributable to gelatinization such as that which occurs in glue, but instead is attributable to the deprotonation of the starch molecules when exposed to the high pH environment created by the hydration of the cement 102 in the plaster 112 upon addition of the water 116. This deprotonation and gain in cohesiveness is amplified by shortening the polymeric chain in the starch 108, this is in direct contrast to conventional gelatinization which requires the maintenance of a long chain starch polymer.

Figure 2:
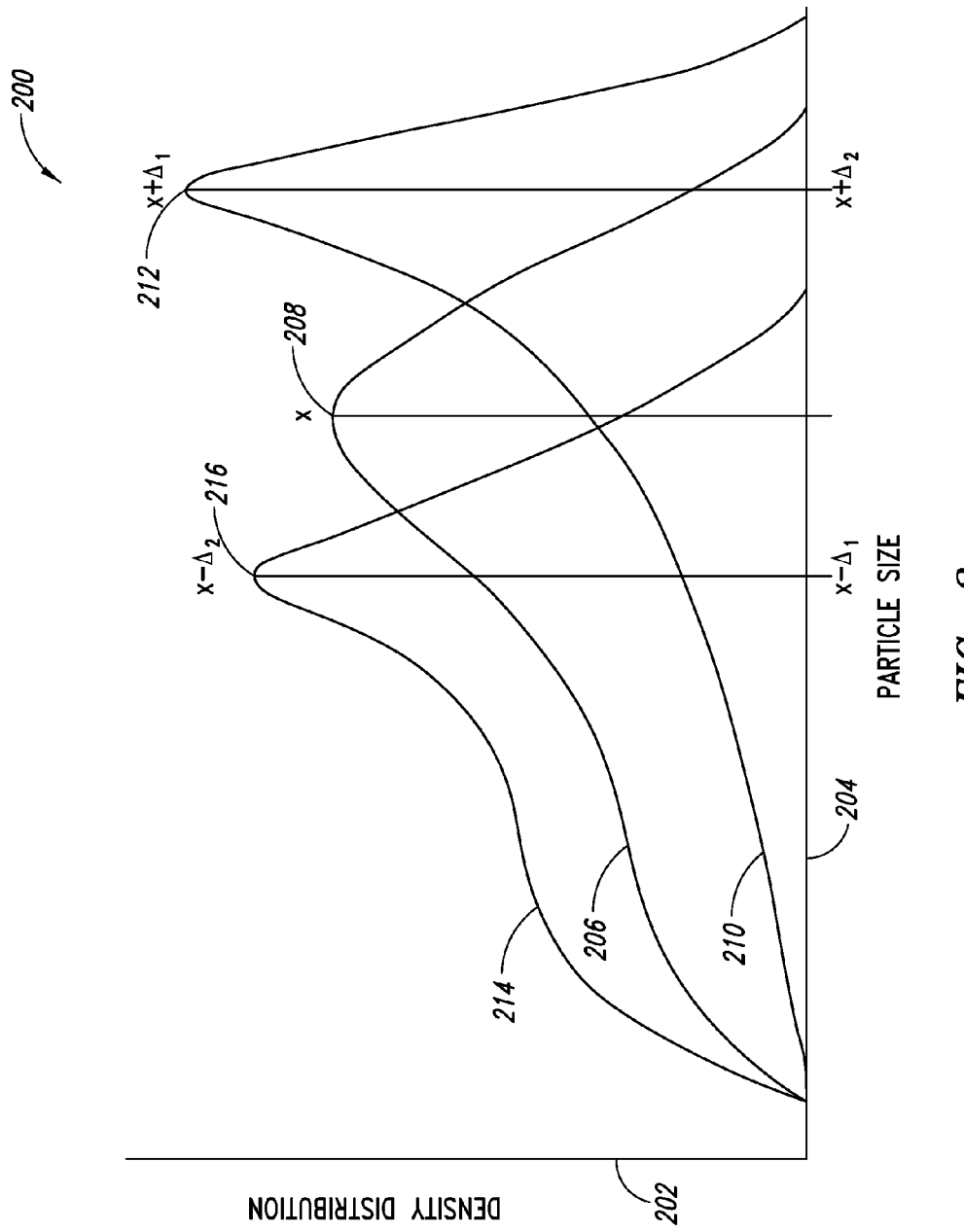
FIG. 2 is a graph showing a hypothetical particle size distribution in an illustrative plaster, the statistical mode of the non-reactive fine aggregate particle size distribution is less than the statistical mode of the white Portland cement particle size distribution, which is less than the statistical mode of the non-reactive coarse aggregate particle size distribution, according to one non-limiting illustrated embodiment.

FIG. 2 is a graph showing a hypothetical particle size distribution in an illustrative plaster 112. The particle size distribution is plotted as a density 202 along the y-axis as a function of particle size 204 along the x-axis. The particle size distribution of the cement 102 is shown as curve 206 having a statistical mode 208 with a value of "X." The particle size distribution of the non-reactive coarse aggregate 106 is shown as curve 210 having a statistical mode 212 with a value of "X+$\Delta_1$" where $\Delta_1$ represents the difference in size between the cement particle mode and the non-reactive coarse aggregate mode (e.g., 21 micrometers). The particle size distribution of the non-reactive fine aggregate 104 is shown as curve 214 having a statistical mode 216 with a value of "X−$\Delta_2$" where $\Delta_2$ represents the difference in size between the cement particle mode and the non-reactive fine aggregate mode (e.g., 7 micrometers).

Figure 3:
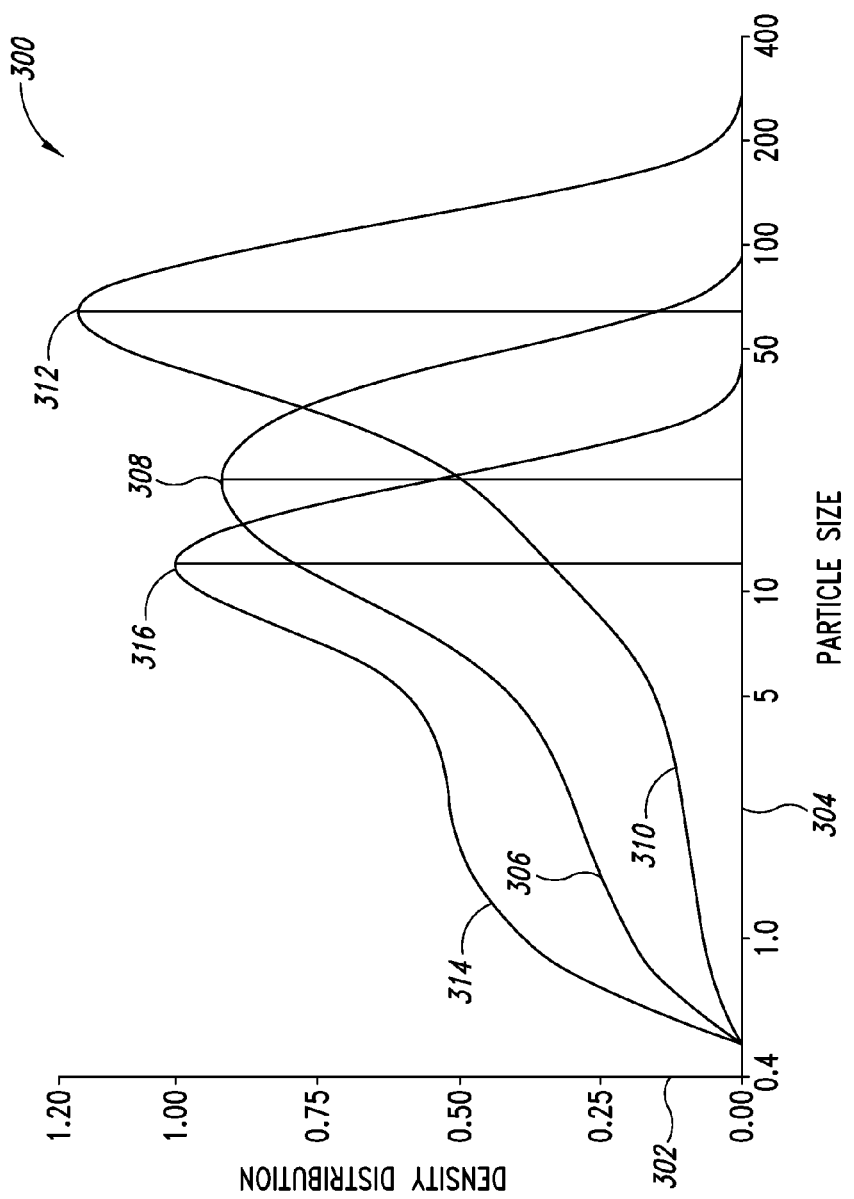
FIG. 3 is a graph showing an actual particle size distribution in an illustrative plaster, the statistical mode of the non-reactive fine aggregate particle size distribution is about 10.5 micrometers, the statistical mode of the white Portland cement particle size distribution is about 20 micrometers, and the statistical mode of the non-reactive coarse aggregate particle size distribution is about 62 micrometers, according to one non-limiting illustrated embodiment.

FIG. 3 is a graph showing an actual particle size distribution in an illustrative plaster 112. The particle size distribution is again plotted as a density 302 along the y-axis as a function of particle size 304 along the x-axis. The particle size distribution of the cement 102 is shown as curve 306 having a statistical mode 308 with a value of about 20 μm. The particle size distribution of the non-reactive coarse aggregate 106 is shown as curve 310 having a statistical mode 312 with a value of about 61 μm. The particle size distribution of the non-reactive fine aggregate 104 is shown as curve 314 having a statistical mode 316 with a value of about 10.5 μm.

Figure 4:
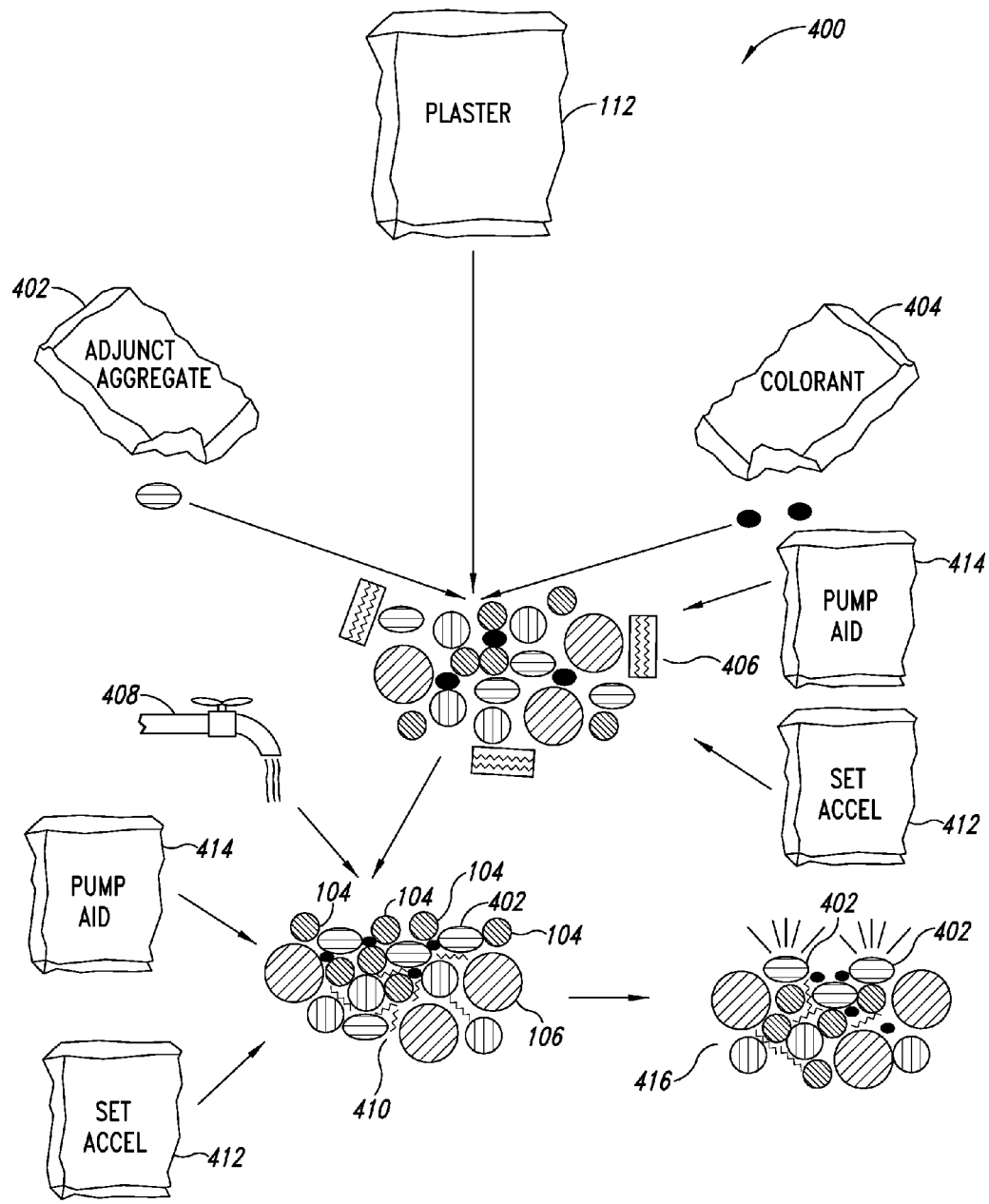
FIG. 4 is a schematic diagram illustrating an example formulation of exposed aggregate plaster slurry including a plaster such as that shown and described in regard to FIG. 1, an adjunct aggregate, and a colorant that is useful in a number of applications including exposed aggregate pool plastering, stucco, and the like, according to one non-limiting illustrated embodiment.

FIG. 4 is a schematic diagram 400 illustrating an example formulation and application of an exposed aggregate finish 416 that is provided by applying exposed aggregate plaster slurry 410 to an underlying substrate followed by removing at least a portion of the surface of the exposed aggregate plaster slurry 410. The exposed aggregate plaster slurry 410 includes at least one plaster 112 such as that shown and described in detail with regard to FIG. 1, at least one adjunct aggregate 402, and at least one colorant 404. Such aggregate plaster slurries 410 may be used in applications where a decorative exposed aggregate finish 416 is desired. Such applications may include, without limitation, swimming pools and stucco finished surfaces.

The at least one adjunct aggregate 402 may include any number of products capable of altering one or more properties of the exposed aggregate finish 416. Such properties may include the aesthetic appeal or appearance of the exposed aggregate finish 416, the physical strength of the exposed aggregate finish 416, the chemical resistance of the exposed aggregate finish 416 or any combination thereof. In some instances, multiple adjunct aggregates 402 may be added to the plaster 112. For example, multiple inert adjunct aggregates having different colors may be added to provide a degree of visual impact to the appearance of the exposed aggregate finish 416. In another example a first adjunct aggregate having favorable physical strength and chemical resistance properties may be combined with a second adjunct aggregate having a desirable appearance to provide an exposed aggregate finish 416 that is both physically and chemically resilient and aesthetically appealing.

Such adjunct aggregates 402 may include one or more naturally occurring substances such as crushed marble, sand, or similar substances. Such adjunct aggregates 402 may also include one or more man-made substances such as plastic or glass beads. In at least some instances, the adjunct aggregates 402 have a particle size distribution greater than the particle size distribution of the plaster 112. For example, the adjunct aggregate 402 can have a minimum particle diameter of about 0.5 mm; about 0.75 mm; about 1 mm; about 1.5 mm; about 2 mm; about 2.5 mm; about 3 mm; about 4 mm; about 5 mm.

The at least one colorant 404 may include one or more pigments, dyes, or similar substances capable of altering the color or appearance of the exposed aggregate finish 416 to a desired hue. The colorants 404 may include various naturally occurring or man-made substances having suitable properties that include but are not limited to, color fastness, fade resistance, chemical resistance, and the like. In some instances, the colorants 404 may be a dry material that is added to the plaster 112. In other instances, the colorants 404 may include a liquid or paste type material that is added to the aggregate plaster slurry 410.

The party (the "applicator") applying the aggregate plaster slurry 410 may mix the plaster 112, at least one adjunct aggregate 402 and colorant 404 at the time the aggregate plaster slurry 410 is mixed. The quantities of adjunct aggregate 402 and colorants 404 are often tailored to suit the needs of a particular client or installation. In at least some instances, the plaster 112 content of the aggregate plaster mixture 406 formed by the plaster 112, the adjunct aggregate 402 and the colorant 404 can be about 10% by weight to about 50% by weight; about 15% by weight to about 45% by weight; about 20% by weight to about 45% by weight; or about 20% by weight to about 35% by weight. In at least some instances, the adjunct aggregate 402 content of the aggregate plaster mixture 406 can be about 25% by weight to about 90% by weight; about 35% by weight to about 80% by weight; or about 40% by weight to about 75% by weight. In at least some instances, the colorant 404 content of the aggregate plaster mixture 406 can be about 0.1% by weight to about 20% by weight; about 0.5% by weight to about 10% by weight; or about 0.5% by weight to about 5% by weight.

Water 408 is added to the aggregate plaster mixture 406 to provide the aggregate plaster slurry 410. The aggregate plaster slurry 410 is then pumped from a catch basin below the mixer to the point of application. At the point of application, the aggregate plaster slurry 410 may be sprayed or hand placed on the underlying substrate. Regardless of the method used to place the aggregate plaster slurry 410, the surface of the aggregate plaster slurry is smoothed by the applicator, usually by hand. The presence of the starch 108 in the plaster 112 advantageously improves the adhesion between the plaster 112 and the adjunct aggregate 402 by providing sufficient stickiness to retain the adjunct aggregate 402 in position in the smoothed aggregate plaster slurry 410. By retaining the adjunct aggregate 402 in position within the placed aggregate plaster slurry 410, uniformity of appearance of the exposed aggregate finish 416 is facilitated. Where the adjunct aggregate 402 provides physical strength or chemical resistance, retaining the adjunct aggregate 402 in position within the placed aggregate plaster slurry 410 can impart a more uniform physical strength or chemical resistance to the exposed aggregate finish 416.

In at least some instances, an optional set accelerator 412 may be added by the applicator to the aggregate plaster slurry 410 to decrease the set time of the placed aggregate plaster slurry. Set accelerators 412 are available in powder or liquid form and may be added either neat or as a solution to the aggregate plaster mixture 406 or to the aggregate plaster slurry 410. Some set accelerators 412 may be added to the aggregate plaster mixture 406, other set accelerators 412 may be added to the water 408 or directly to the aggregate plaster slurry 410. Example set accelerators 412 include, but are not limited to, mixtures or solutions containing soluble chlorides (e.g., calcium chloride), calcium formate, triethanolamine, calcium nitrate, and calcium nitrite.

In at least some instances, an optional pumping aid 414 may be added by the pumper or applicator to the aggregate plaster slurry 410 to improve flow characteristics of the aggregate plaster slurry 410 through pumps and pipelines. Pumping aids 416 are available in powder or liquid form and may be added either neat or as a solution to the aggregate plaster mixture 406 or to the aggregate plaster slurry 410 to alter the slurry rheology to reduce pressure drop and friction of the slurry in pump lines used to convey the slurry (e.g., from a mixer to a point of application). Some pumping aids 414 may be added to the aggregate plaster mixture 406, other pumping aids 414 may be added to the water 408 or directly to the aggregate plaster slurry 410. Example pumping aids 414 include, but are not limited to, mixtures or solutions containing soda ash, bentonite, clays, various polymeric materials, and the like.

As the placed aggregate plaster slurry 410 stiffens, the outer surface of the aggregate plaster slurry 410 is removed to expose the underlying adjunct aggregate 402 thereby providing the exposed aggregate finish 416. Removal of the outer surface of the aggregate plaster slurry can be accomplished by washing the outer surface from the aggregate plaster slurry 410 after placement. Advantageously, the presence of the unmodified hydrophilic starch 108 in the plaster 112 has been found to improve the retention of the adjunct aggregate 402 in the aggregate plaster slurry when the stiffened outer surface of the slurry is removed to expose the aggregate. In the absence of the unmodified hydrophilic starch 108, the adjunct aggregate 402 was observed to have a greater tendency to separate from the stiffened aggregate plaster slurry. Loss of the exposed adjunct aggregate 402 from the stiffened aggregate plaster slurry adversely impacts the visual appearance of the exposed aggregate finish and requires time-consuming and potentially costly repair procedures to restore the appearance.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A plaster composition, comprising:
 a cement having a first particle size distribution with a first mode;
 a non-reactive fine aggregate having a second particle size distribution with a second mode that is less than the first mode;
 a non-reactive coarse aggregate having a third particle size distribution with a third mode that is greater than the first mode; and
 an unmodified hydrophilic starch.

2. The plaster composition of claim 1 wherein the cement comprises a white Portland cement having a HunterLab whiteness value in excess of about 90.

3. The plaster composition of claim 2 wherein the first particle size distribution includes cement particles having a particle size of from about 0.1 micrometers ($\mu$m) to about 100 $\mu$m.

4. The plaster composition of claim 1 wherein the non-reactive fine aggregate and the non-reactive coarse aggregate each comprise a non-reactive aggregate having a HunterLab whiteness value in excess of about 90.

5. The plaster composition of claim 4 wherein the non-reactive fine aggregate and the non-reactive coarse aggregate each comprise limestone.

6. The plaster composition of claim 5 wherein substantially all of the limestone comprises calcite.

7. The plaster composition of claim 4 wherein the second particle size distribution includes non-reactive aggregate particles having a particle size of from about 0.1 micrometers ($\mu$m) to about 100 $\mu$m.

8. The plaster composition of claim 7 wherein the second mode is at least about 2 micrometers ($\mu$m) less than the first mode.

9. The plaster composition of claim 4 wherein the third particle size distribution includes non-reactive aggregate particles having a particle size of from about 0.1 micrometers ($\mu$m) to about 250 $\mu$m.

10. The plaster composition of claim 9 wherein the third mode is at least about 10 micrometers ($\mu$m) greater than the first mode.

11. The plaster composition of claim 1 wherein the unmodified hydrophilic starch comprises at least one of: a tapioca starch, a cassava starch, a potato starch, a rice starch, a wheat starch, or a corn starch.

12. The plaster composition of claim 11 wherein the unmodified hydrophilic starch comprises an unmodified starch having a HunterLab whiteness value in excess of about 90.

13. The plaster composition of claim 11 wherein the unmodified hydrophilic starch comprises a starch having a minimum of about 80% by weight amylopectin content.

14. The plaster composition of claim 11 wherein the unmodified hydrophilic starch comprises a starch having a water content of less than about 15% by weight.

15. A method of providing a plaster mixture, comprising:
 combining a cement, a non-reactive fine aggregate, a non-reactive coarse aggregate, and an unmodified hydrophilic starch to provide a cement mixture comprising:
 about 60% to about 98% by weight of a cement having a first particle size distribution of from about 0.1 micrometers ($\mu$m) to about 100 $\mu$m with a first mode;
 about 1% to about 30% by weight of a non-reactive fine aggregate having a particle size distribution of from about 0.1 micrometers ($\mu$m) to about 100 $\mu$m, and a second mode that is at least about 2 micrometers ($\mu$m) less than the first mode;
 about 1% to about 30% by weight of a non-reactive coarse aggregate having a particle size distribution of from about 0.1 micrometers ($\mu$m) to about 250 $\mu$m, and a third mode that is at least about 10 micrometers ($\mu$m) greater than the first mode; and
 about 0.001% to about 5% by weight of an unmodified, hydrophilic, starch having a minimum amylopectin content of about 80% by weight.

16. The method of claim 15, further comprising combining the plaster mixture with at least one adjunct aggregate having a diameter of greater than about 0.1 millimeters (mm) and water to provide an exposed aggregate plaster slurry.

17. A plaster composition, comprising:
- about 60% to about 98% by weight of a white Portland cement having a HunterLab whiteness value in excess of about 90 and a first particle size distribution of from about 0.1 micrometers (μm) to about 100 μm with a first mode;
- about 1% to about 30% by weight of a non-reactive fine aggregate having a HunterLab whiteness value in excess of about 90, a particle size distribution of from about 0.1 micrometers (μm) to about 100 μm, and a second mode that is at least about 2 micrometers (μm) less than the first mode;
- about 1% to about 30% by weight of a non-reactive coarse aggregate having a HunterLab whiteness value in excess of about 90, a particle size distribution of from about 0.1 micrometers (μm) to about 250 μm, and a third mode that is at least about 10 micrometers (μm) greater than the first mode; and
- about 0.001% to about 5% by weight of an unmodified, hydrophilic, starch having a HunterLab whiteness value in excess of about 90, a minimum amylopectin content of about 80% by weight, and a water content of less than about 15% by weight.

18. The plaster composition of claim 17 wherein the non-reactive fine aggregate and the non-reactive coarse aggregate each comprise limestone.

19. The plaster composition of claim 18 wherein substantially all of the limestone comprises calcite.

20. The plaster composition of claim 17 wherein the unmodified hydrophilic starch comprises at least one of: a tapioca starch, a cassava starch, a potato starch, a rice starch, a wheat starch, or a corn starch.

* * * * *

UNITED STATES PATENT AND TRADEMARK OFFICE
CERTIFICATE OF CORRECTION

PATENT NO. : 8,864,903 B2  
APPLICATION NO. : 13/717054  
DATED : October 21, 2014  
INVENTOR(S) : Wilasa Vichit-Vadakan et al.

Page 1 of 1

It is certified that error appears in the above-identified patent and that said Letters Patent is hereby corrected as shown below:

On the title page
Item (56), References Cited, Foreign Patent Documents:
"JP 2004269501 A 10/2007" should read, --JP 2007269501 A 10/2007--.

Signed and Sealed this
Twenty-second Day of March, 2016

Michelle K. Lee
*Director of the United States Patent and Trademark Office*